2,851,461
Patented Sept. 9, 1958

2,851,461

PRODUCTION OF HETEROCYLIC NITROGEN COMPOUNDS

Robert J. Zellner, Marinette, Wis., assignor to Ansul Chemical Company, Marinette, Wis., a corporation of Wisconsin No Drawing. Application June 4, 1956
Serial No. 588,969

4 Claims. (Cl. 260—290)

This invention relates to the production of alkyl pyridines and more particularly to an improved process for the more efficient production of 3,5-dialkylpyridines. These pyridines are useful as starting materials or intermediates for the production of derivatives thereof comprising synthetic fibers, pharmaceuticals, dyes, and many other chemicals.

3,5-diethylpyridine has been synthesized from ammonia and n-butanol and also from ammonia and n-butyraldehyde (Prostenik, M. and Filipovir, L., Arhiv. Kem. 21, 175–181 (1949)). However, the yield of 3,5-diethylpyridine was exceedingly small, the main product of the reactions being 2-propyl-3,5-diethylpyridine.

3,5-dimethylpyridine has been produced by the catalytic vapor phase reaction of ammonia and methacrolein (Hearne and Buls, British Pat. 654,443) and from ammonia, ethylal and propionaldehyde (Oparina, J. Russ. Phys. Chem. Soc. 61, 2001 (1929)), but the yields are rather poor and these starting materials are either expensive or hard to handle. It has also been obtained in small yields as a by-product from the preparation of pyridine and 3-picoline from acetylene, methanol and ammonia (Ishiguro and Kuboto, J. Pharm. Soc. Japan 72, 897 (1952)). The present invention is an improvement over the above methods.

The novel process of this invention possesses the outstanding advantages that it yields 3,5-dialkylpyridines directly in a single reaction step as the major product and in a state of high purity, uncontaminated by isomers and homologs that are difficult or impossible to separate from the desired product. The invention provides a source of these alkyl pyridines that is independent of the coal tar industry.

It is an object of this invention to provide an improved method for the production of 3,5-dialkylpyridines in good yields from inexpensive, readily available raw materials. It is a further object of this invention to provide a catalytic vapor phase process for the production of 3,5-dimethylpyridine and 3,5-diethylpyridine. It is a still further object of this invention to provide a method for the production of 3,5-dialkylpyridines of good purity. Still other objects will be apparent from the following description.

This invention is based in part on the discovery that 3,5-dialkylpyridines can be prepared in good yields and high purity by passing a stream of vapors of an aliphatic alcohol of at least 3 carbon atoms in admixture with formaldehyde and ammonia over a silica-alumina catalyst in a reaction zone maintained at 250° C. to 500° C. A petroleum cracking catalyst of high surface area containing 10–25% by weight alumina is preferred, although other catalysts may be used. The preferred reaction temperature will vary somewhat with the starting materials and the catalyst, but below 250° C. the conversion to pyridines is quite low. At temperatures above 500° C. decomposition of the intermediates and final products becomes rather serious. Inert diluents such as steam or nitrogen may or may not be used, but if present in large amounts the conversion to alkyl pyridines will be adversely affected.

Significant quantities of amines were produced as by-products of this reaction. It seems likely that these compounds would also be converted to pyridines if recycled to the reactor, but since this has not yet been definitely established, no credit was given for these materials when calculating yields.

The alcohol to formaldehyde ratio of the feed mixture is not at all critical but it is preferred that they be present in approximately equi-molar proportions. A large excess of alcohol reduced the conversion to pyridines per pass, but had little effect on yield. Excessive formaldehyde resulted in the formation of undesirable resinous products.

The following examples will illustrate the nature of the invention but the invention is not restricted to these examples.

*Example 1*

A feed solution was made up of equal parts of n-propanol and n-propyl Formcel. N-propyl Formcel is a commercially available solution containing approximately 40% formaldehyde, 53% n-propanol and 7% water. This feed solution, containing n-propanol and formaldehyde in the mole ratio of 1.9 to 1, was vaporized and the vapors were fed at a rate of 1300 grams per hour together with ammonia at a rate of 350 grams per hour to a reactor containing one liter of fluidized silica-alumina catalyst at 350° C. The pressure was essentially atmospheric. The gases issuing from the reactor were condensed and the condensate saturated with flake caustic. The oil layer was separated and fractionally distilled to recover the unused n-propanol and the product, 3,5-dimethylpyridine. The conversion of n-propanol to and yield of 3,5-dimethylpyridine were 14.7% and 30% by weight respectively.

*Example 2*

Example 1 was repeated except that the catalyst bed was maintained at 400° C. The conversion of n-propanol to and yield of 3,5-dimethylpyridine were 15.7% and 37% by weight respectively.

*Example 3*

N-propyl Formcel (containing n-propanol and formaldehyde in the mole ratio of 1 to 1.5) was fed at a rate of 1220 grams per hour together with ammonia at 331 grams per hour to the reactor containing one liter of silica-alumina catalyst at 350° C. The condensate was treated as in Example 1. The conversion of n-propanol to and yield of 3,5-dimethylpyridine were 29.1% and 39% by weight respectively. The 3,5-dimethylpyridine so produced was analyzed and found to be more than 90% pure. The contaminants remaining were non-basic and therefore easily separated.

*Example 4*

A feed solution was made up from n-butyl alcohol and n-butyl Formcel so that it contained equi-molar amounts of formaldehyde and n-butyl alcohol. This solution was vaporized and the vapors fed at a rate of 1025 grams per hour together with ammonia at a rate of 345 grams per hour to a reactor containing one liter of fluidized silica-alumina catalyst at 400° C. The gases issuing from the reactor were treated as in Example 1. The conversion of n-butanol to and yield of 3,5-diethylpyridine was 13% and 13.2% by weight respectively.

*Example 5*

Example 4 was repeated except that the catalyst bed was maintained at 350° C. The conversion of n-butanol to and yield of 3,5-diethylpyridine were 17% and 19% by weight respectively. The 3,5-diethylpyridine so prepared had a purity in excess of 95%.

I claim:

1. A process for the synthesis of 3,5-dialkylpyridines which comprises passing a mixture of a saturated aliphatic alcohol of at least 3 carbon atoms, formaldehyde and ammonia over a silica-alumina catalyst containing 10 to 25 percent by weight of alumina at a temperature of 250 to 500° C. and at substantially atmospheric pressure.

2. A process as defined in claim 1 for the synthesis of 3,5-dimethylpyridine which comprises passing a mixture of formaldehyde, n-propanol and ammonia over a silica-alumina catalyst at said elevated temperature and essentially atmospheric pressure.

3. A process according to claim 1, wherein the formaldehyde to n-propanol mole ratio is within the range of 2:1 to 1:10.

4. A process as defined in claim 1 for the synthesis of 3,5-diethylpyridine which comprises passing a mixture of n-butanol, formaldehyde and ammonia over a silica-alumina catalyst at said elevated temperature and essentially atmospheric pressure.

References Cited in the file of this patent
UNITED STATES PATENTS

| | | |
|---|---|---|
| 2,523,580 | Mahan | Sept. 26, 1950 |
| 2,605,264 | Hoog et al. | July 29, 1952 |
| 2,744,904 | Cislak et al. | May 8, 1956 |

OTHER REFERENCES

Stitz: APC Specification, S. N. 387,106, July 13, 1943.

Ishiguro et al.: Chem. Abstracts, vol. 47, col. 6416 (1953).

Uchida et al.: Chem. Abstracts, vol. 48, col. 1416 (1954).